US012647668B2

(12) United States Patent　　　　(10) Patent No.:　US 12,647,668 B2
Kinoshita　　　　　　　　　　　　　(45) Date of Patent:　　Jun. 2, 2026

(54) IMAGE PROCESSING APPARATUS, IMAGE PICKUP APPARATUS, AND CONTROL METHODS FOR THOSE APPARATUSES

(71) Applicant: CANON KABUSHIKI KAISHA, Tokyo (JP)

(72) Inventor: Ayana Kinoshita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 32 days.

(21) Appl. No.: 18/927,198

(22) Filed: Oct. 25, 2024

(65) Prior Publication Data

US 2025/0056112 A1　　Feb. 13, 2025

Related U.S. Application Data

(63) Continuation of application No. PCT/JP2023/014607, filed on Apr. 10, 2023.

(30) Foreign Application Priority Data

Apr. 28, 2022　(JP) ................................. 2022-074365

(51) Int. Cl.
H04N 23/61　　　(2023.01)
G06F 40/242　　(2020.01)

(52) U.S. Cl.
CPC ........... H04N 23/61 (2023.01); G06F 40/242 (2020.01)

(58) Field of Classification Search
CPC .................. H04N 23/61; G06F 40/242; G06T 2207/20081; G06T 2207/20084;
(Continued)

(56) References Cited

U.S. PATENT DOCUMENTS 11,354,936 B1 * 6/2022 Chandarana ......... G06V 40/172
11,562,145 B2 * 1/2023 Tu ............................ G06N 3/09
(Continued)

FOREIGN PATENT DOCUMENTS

JP　　2011090413 A　　5/2011
JP　　2020071873 A　　5/2020
(Continued)

OTHER PUBLICATIONS

Wang et al.; "Frustratingly Simple Few-Shot Object Detection"; arXiv:2003.06957v1 [cs.CV]; arxiv.org; Mar. 16, 2020; Cornell University Library, Ithaca, NY; XP081621853.
(Continued)

*Primary Examiner* — Chiawei Chen
(74) *Attorney, Agent, or Firm* — Canon U.S.A., Inc. IP Division

(57) ABSTRACT

In an image processing apparatus, first acquisition means for acquiring first teacher data including image data of a positive instance for a first target, second acquisition means for acquiring second teacher data including image data of a negative instance for the first target, and generation means for generating first dictionary data for detecting the first target based on the teacher data acquired by the first acquisition means and the second acquisition means are included, and it is characterized in that the learning means performs additional learning on second dictionary data to generate the first dictionary data, and that a number of pieces of the first teacher data acquired by the first acquisition means is smaller than a number of pieces of the second teacher data acquired by the second acquisition means.

15 Claims, 12 Drawing Sheets

IMAGE SELECTION

INPUT OF OBJECT AREA

(58) Field of Classification Search

CPC . G06T 2207/30201; G06T 7/11; G06V 10/17; G06V 10/235; G06V 10/25; G06V 10/764; G06V 10/772; G06V 10/774; G06V 10/778; G06V 10/82; G06V 10/945

See application file for complete search history.

(56) References Cited

U.S. PATENT DOCUMENTS

| | | | | |
|---|---|---|---|---|
| 11,594,058 | B2 * | 2/2023 | James | G06F 18/2413 |
| 12,132,987 | B2 * | 10/2024 | Kanda | G06V 10/772 |
| 2011/0090359 | A1 | 4/2011 | Sagawa | |
| 2015/0095017 | A1 * | 4/2015 | Mnih | G06F 40/216 |
| | | | | 704/9 |
| 2017/0330054 | A1 * | 11/2017 | Fu | G06V 10/82 |
| 2018/0107900 | A1 * | 4/2018 | Takahashi | G06F 3/03543 |
| 2019/0188285 | A1 * | 6/2019 | Scheau | G06F 16/9535 |
| 2019/0318200 | A1 * | 10/2019 | Inoshita | G06F 18/40 |
| 2020/0137300 | A1 | 4/2020 | Ogawa | |
| 2020/0380403 | A1 * | 12/2020 | Aggarwal | G06V 10/82 |
| 2020/0410291 | A1 * | 12/2020 | Kriegman | G06V 20/63 |
| 2021/0042580 | A1 * | 2/2021 | Chen | G06N 3/084 |
| 2023/0072913 | A1 * | 3/2023 | Xu | G06N 20/00 |

FOREIGN PATENT DOCUMENTS

| | | |
|---|---|---|
| JP | 2020126434 A | 8/2020 |
| JP | 2020135494 A | 8/2020 |
| JP | 2021057672 A | 4/2021 |
| JP | 2021189554 A | 12/2021 |
| JP | 2021189616 A | 12/2021 |
| WO | 2020171066 A1 | 8/2020 |

OTHER PUBLICATIONS

Massiceti et al.; "Orbit: A Real-World Few-Shot Dataset for Teachable Object Recognition"; arXiv; Oct. 8, 2021; pp. 1-34, DOI: 10.25383/city.14294597; retrieved from the Internet: URL:https://arxiv.org/pdf/2104.03841 [retrieved on Nov. 13, 2025]; XP093336120.

* cited by examiner

FIG. 1

SET HUMAN FIGURE AS OBJECT TO BE DETECTED

OBJECT TO BE DETECTED

HUMAN FIGURE
ANIMAL
VEHICLE
CUSTOM ~706

705

707

708

SET CUSTOM AS OBJECT TO BE DETECTED

IMAGE SELECTION

INPUT OF OBJECT AREA

NOTIFICATION OF START

IMAGE PROCESSING APPARATUS, IMAGE PICKUP APPARATUS, AND CONTROL METHODS FOR THOSE APPARATUSES

CROSS-REFERENCE TO RELATED APPLICATIONS

This application is a Continuation of International Patent Application No. PCT/JP2023/014607, filed Apr. 10, 2023, which claims the benefit of Japanese Patent Application No. 2022-074365, filed Apr. 28, 2022, both of which are hereby incorporated by reference herein in their entirety.

TECHNICAL FIELD

The present invention relates to an image processing apparatus related to a trained model that detects a specific object by using machine learning, an image pickup apparatus, and control methods for those apparatuses.

BACKGROUND ART

Object detection is one of fields of computer vision research and has been widely studied so far. The computer vision is a technique for understanding an image that has been input to a computer and automatically identifying various features of the image. In the technique, the object detection is a task for estimating a position and a type of an object that is present in the image. The object detection is applied to an autofocus technique or the like of an image pickup apparatus.

In recent years, an image processing apparatus which detects an object by a machine learning scheme represented by a neural network or the like has been known. By using a trained model (dictionary data) corresponding to a specific object, such an image processing apparatus detects the specific object to perform image pickup control. As a type of the specific object, a human figure, an animal such as a dog or a cat, or a vehicle such as an automobile is representative, which is a highly demanded object for an autofocus (AF) function of the image pickup apparatus.

Japanese Patent Laid-Open No. 2021-57672 discloses an image processing apparatus that collects an image from a user and detects an AF point appropriate for the user by additional learning. However, since images are automatically categorized to perform learning, it is difficult to detect any new object desired by the user to be detected.

CITATION LIST

Patent Literature

PTL 1 Japanese Patent Laid-Open No. 2021-57672

In addition, to generate dictionary data with which it is possible to detect any new object desired by the user to be detected, it is necessary for the user to provide teacher data of the object. However, in some cases, the number of pieces of data (teacher data of a positive instance) that can be prepared by the user is small, and an issue occurs that dictionary data with a sufficient level of detection performance is not acquired.

SUMMARY OF INVENTION

An object of the present invention is to provide an image processing apparatus capable of generating or using dictionary data with detection performance of a certain level or more from a small number of pieces of positive instance data.

To achieve the above-described object, an image processing apparatus of the present invention includes first acquisition means for acquiring first teacher data including image data of a positive instance for a first target, second acquisition means for acquiring second teacher data including image data of a negative instance for the first target, and generation means for generating first dictionary data for detecting the first target based on the teacher data acquired by the first acquisition means and the second acquisition means, and it is characterized in that the generation means performs additional learning on second dictionary data to generate the first dictionary data, and that a number of pieces of the first teacher data acquired by the first acquisition means is smaller than a number of pieces of the second teacher data acquired by the second acquisition means.

Further features of the present invention will become apparent from the following description of exemplary embodiments with reference to the attached drawings.

BRIEF DESCRIPTION OF DRAWINGS

FIG. 1 is a configuration diagram of an image processing system according to a first embodiment of the present invention.

DESCRIPTION OF EMBODIMENTS

Figure 2:
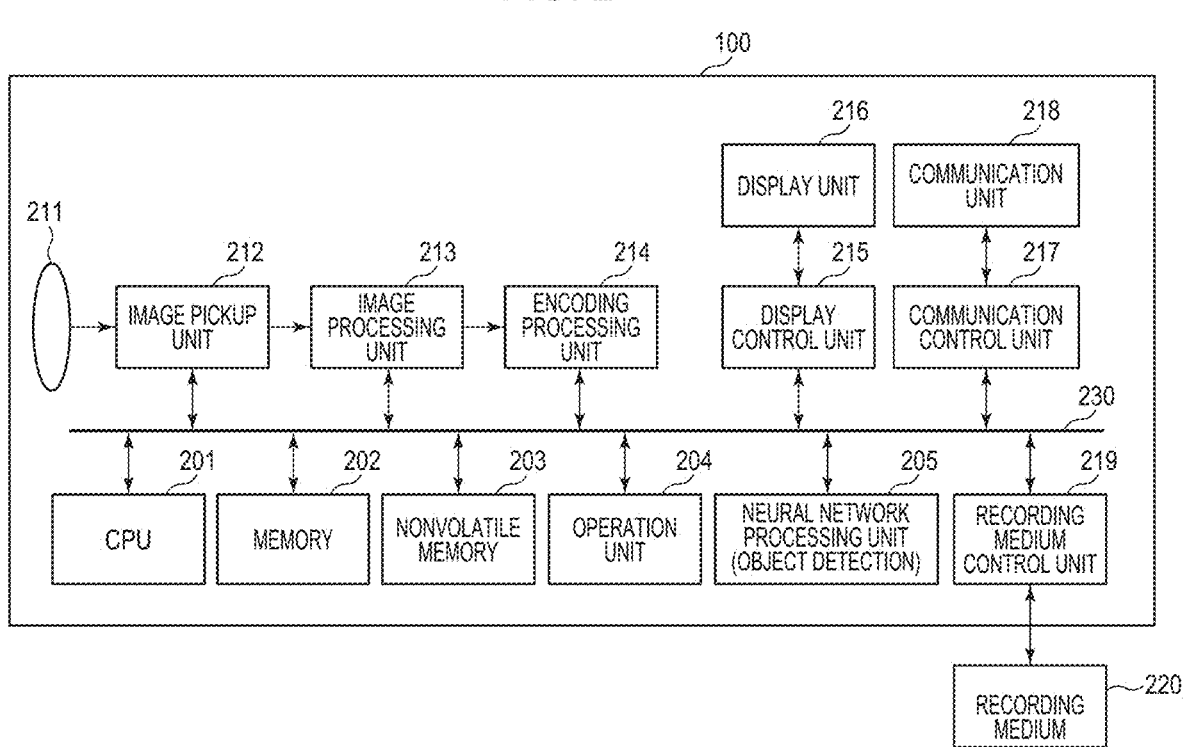
FIG. 2 is a block diagram illustrating a configuration example of an image pickup apparatus 100 of the first embodiment.

Hereinafter, with reference to the attached drawings, a preferred embodiment of the present invention will be described with use of embodiments. Note that same members or elements in the respective drawings are assigned with same reference signs, and duplicate explanations will be omitted or simplified.

In addition, according to the present embodiment, an example of an application to an information processing server as an image processing apparatus will be described. However, the image processing apparatus includes an electronic device or the like having an image pickup function, such as a digital still camera, a digital movie camera, a smartphone with a camera, a tablet computer with a camera, a network camera, an in-vehicle camera, a drone camera, or a camera mounted to a robot.

First Embodiment

Hereinafter, an image processing system according to a first embodiment will be described in detail.

Figure 1:
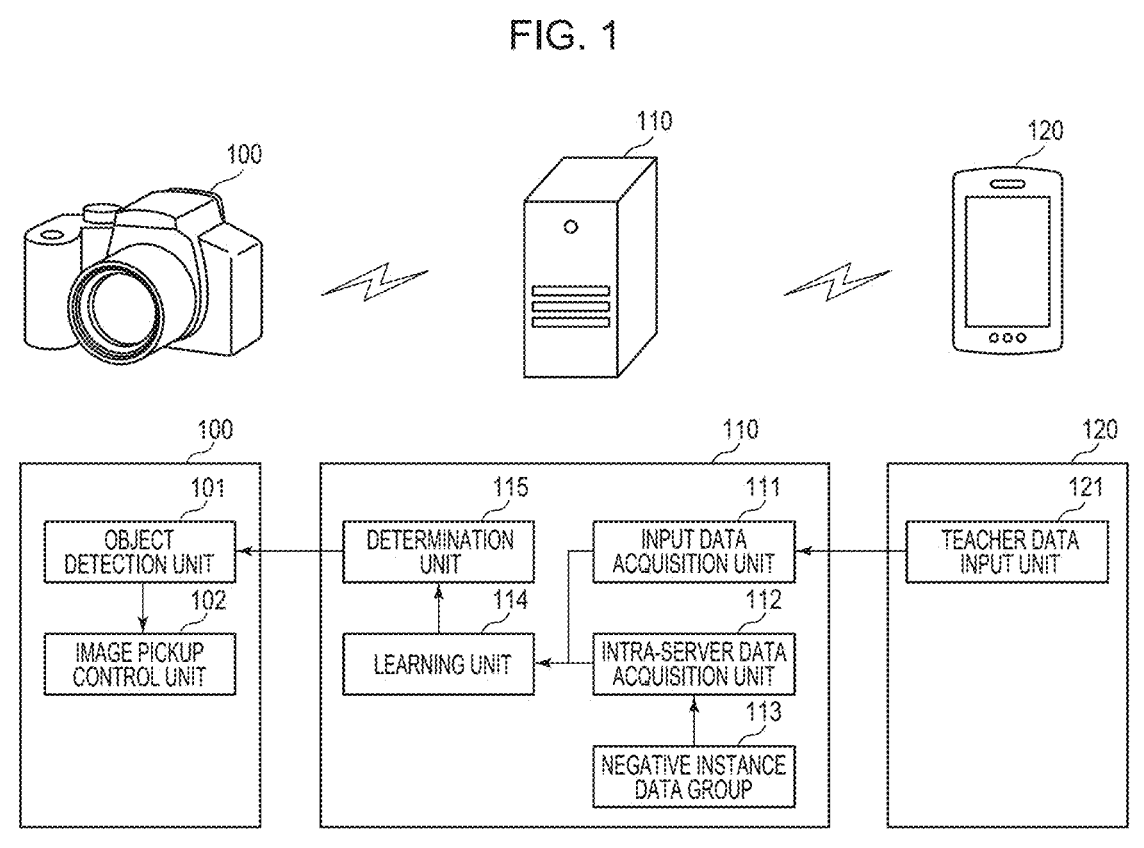

FIG. 1 is a configuration diagram of the image processing system according to the first embodiment, and the image processing system is constituted by an image pickup apparatus 100, a server 110 serving as an information processing server, a mobile terminal 120 serving as an information processing terminal, and the like. The image pickup apparatus 100 and the server 110 are connected to each other by a wireless communication network, for example. In addition, the server 110 and the mobile terminal 120 are connected to each other by a wireless communication network, for example.

Note that functional blocks in the server 110 and the mobile terminal 120 which are illustrated in FIG. 1 are respectively realized by causing computers respectively included in the server 110 and the mobile terminal 120 to execute computer programs stored in memories serving as storage media.

The image processing system according to the first embodiment performs object detection based on a neural network and also enables detection of any object by the user. Examples of a representative scheme of the object detection include a scheme called convolutional neural network (hereinafter, abbreviated as CNN). According to the CNN, inference processing is executed based on an image signal and dictionary data that is a processing parameter, and the dictionary data is generated in advance through learning processing based on teacher data.

In the image processing system of the first embodiment, the mobile terminal 120 includes a teacher data input unit 121 serving as teacher data input means for inputting teacher data for object detection. In addition, the teacher data input unit 121 executes a teacher data input step of inputting teacher data for the object detection.

In addition, the teacher data input unit 121 can input, while image data and object area information of the image data in which a target object is present are prepared as a set of the teacher data, a plurality of sets of the teacher data, and the plurality of sets can be transmitted to the server 110.

In the server 110, an input data acquisition unit 111 serving as first acquisition means acquires positive instance teacher data and negative instance teacher data which are transmitted from the mobile terminal 120, and an intra-server data acquisition unit 112 serving as second acquisition means acquires a predetermined number of pieces of negative instance teacher data from among a negative instance data group 113 prepared in the server 110 in advance. At this time, the number of pieces of data input by the user using the teacher data input unit 121 including the positive instance data and the negative instance data is set to be equal to or less than 100. Herein, it is desired that, more preferably, five or more pieces of positive instance teacher data are input from the user to enable detection of an object intended by the user. However, a sufficient level of performance is not to be achieved when learning is performed by using only 100 or fewer pieces of data input by the user.

In view of the above, the intra-server data acquisition unit 112 acquires 101 or more pieces of teacher data to be used for learning. Herein, for example, the intra-server data acquisition unit 112 uses 10,000 or more pieces of negative instance teacher data, so that it is possible to perform learning with which an object detection rate is compensated and increased even though the number of pieces of positive instance teacher data from the user is small. As a result, sufficient learning can be performed while a load of a data input operation on the user side is reduced.

Custom dictionary data is generated in a learning unit 114 by way of performing, based on the acquired data, additional learning on pre-trained base dictionary data. The generated custom dictionary data is transmitted to the image pickup apparatus 100 after a determination unit 115 determines whether to further acquire negative instance teacher data. According to the first embodiment, the learning unit 114 is provided in the server 110 serving as the information processing server which is different from the image pickup apparatus.

In the image pickup apparatus 100, the dictionary data transmitted from the server 110 is received, and inference processing based on the neural network is performed by an object detection unit 101 based on the received dictionary data. Subsequently, image pickup control such as autofocus is executed in an image pickup control unit 102 based on an inference result. That is, the image pickup apparatus 100 performs object detection based on the dictionary data and performs predetermined image pickup control (such as autofocus or exposure control) on an object detected through the object detection.

FIG. 2 is a block diagram illustrating a configuration example of the image pickup apparatus 100 of the first embodiment. As illustrated in FIG. 2, the image pickup apparatus 100 includes a CPU 201, a memory 202, a nonvolatile memory 203, an operation unit 204, a neural network processing unit 205, an image pickup unit 212, an image processing unit 213, and an encoding processing unit 214. The image pickup apparatus 100 further includes a display control unit 215, a display unit 216, a communication control unit 217, a communication unit 218, a recording medium control unit 219, and an internal bus 230.

The image pickup apparatus 100 causes an optical image of the object to be focused on a pixel array of the image pickup unit 212 by using a shooting lens 211, but the shooting lens 211 may be non-detachable or may be detachable from a body (a body frame or a main body) of the image pickup apparatus 100. In addition, the image pickup apparatus 100 performs write and read of image data to and from a recording medium 220 via the recording medium control unit 219. The recording medium 220 may be detachable or may be non-detachable from the image pickup apparatus 100.

The CPU 201 controls each of the units (each of the functional blocks) in the image pickup apparatus 100 via the internal bus 230 by executing a computer program stored in the nonvolatile memory 203.

The memory 202 is a rewritable volatile memory. The memory 202 temporarily records a computer program for controlling an operation of each unit in the image pickup apparatus 100, information such as a parameter related to the operation of each unit in the image pickup apparatus 100, information received by the communication control unit 217, and the like. The memory 202 also temporarily records an image acquired by the image pickup unit 212 and an image and information which have been processed by the image processing unit 213, the encoding processing unit 214, or the like. The memory 202 is provided with a sufficient storage capacity to temporarily record these images and information.

The nonvolatile memory 203 is a memory where electrical deletion and recording can be performed, and for example, an EEPROM, a hard disk, or the like is used. The nonvolatile memory 203 stores information such as a computer program for controlling an operation of each unit in the image pickup apparatus 100 and a parameter related to the operation of each unit in the image pickup apparatus 100. In accordance with such a computer program, various operations to be performed by the image pickup apparatus 100 are realized. The nonvolatile memory 203 further stores a computer program which is to be used in the neural network processing unit 205 and in which processing content of the neural network is described, and a trained coefficient parameter such as a weight coefficient or a bias value.

Note that the weight coefficient is a value indicating a strength of connection between nodes in the neural network, and the bias is a value for providing an offset to an integrated value of the weight coefficient and the input data. The nonvolatile memory 203 can hold a plurality of trained coefficient parameters and a plurality of computer programs in which the processing of the neural network is described.

Note that instead of the nonvolatile memory 203, the memory 202 may temporarily store a plurality of computer programs which are to be used in the neural network processing unit 205 and in which the processing of the neural network is described and a plurality of trained coefficient parameters which have been described above. Note that the computer program in which the processing of the neural network is described and the trained coefficient parameter are equivalent to the dictionary data for the object detection.

The operation unit 204 provides a user interface for operating the image pickup apparatus 100. The operation unit 204 includes various buttons such as a power button, a menu button, a release button for shooting, a movie recording button, and a cancel button. The various buttons are constituted by a switch, a touch panel, and the like. The CPU 201 controls the image pickup apparatus 100 according to an instruction from the user which is input via the operation unit 204.

Note that herein, a case has been described as an example where the CPU 201 controls the image pickup apparatus 100 based on an operation input via the operation unit 204 but is not limited to this. For example, the CPU 201 may control the image pickup apparatus 100 based on a request input from a remote controller which is not illustrated in the drawing or the mobile terminal 120 via the communication unit 218.

In the neural network processing unit 205, the inference processing of the object detection unit 101 based on the dictionary data is performed. A detail thereof will be described below with reference to FIG. 3.

The shooting lens (lens unit) 211 is constituted by a lens group including a zoom lens, a focus lens, and the like, a lens control unit which is not illustrated in the drawing, a diaphragm which is not illustrated in the drawing, and the like. The shooting lens 211 may function as zoom means for changing a field angle. The lens control unit of the shooting lens 211 performs adjustment of focus and control of an aperture value (F number) based on control signals transmitted from the CPU 201.

The image pickup unit 212 may function as acquisition means for sequentially acquiring a plurality of images including a motion image. For example, a CCD (charge coupling device) image sensor, a CMOS (complementary metal oxide semiconductor) image sensor, or the like is used as the image pickup unit 212. The image pickup unit 212 has a pixel array which is not illustrated in the drawing in which photoelectric conversion units (pixels) that convert the optical image of the object into electrical signals are arranged in a matrix manner, that is, a two-dimensional manner. The optical image of the object is focused on the pixel array by the shooting lens 211. The image pickup unit 212 outputs a picked-up image to the image processing unit 213 or the memory 202. Note that the image pickup unit 212 can also acquire a still image.

The image processing unit 213 performs predetermined image processing on image data output from the image pickup unit 212 or image data read from the memory 202. Examples of the image processing include dynamic range conversion processing, interpolation processing, reduction processing (resizing processing), color conversion processing, and the like. The image processing unit 213 also performs predetermined calculation processing for exposure control, ranging control, or the like by using the image data acquired by the image pickup unit 212.

Then, the exposure control, the ranging control, and the like are performed by the CPU 201 based on a calculation result acquired through the calculation processing by the image processing unit 213. Specifically, AE (Auto Exposure) processing, AWB (Auto White Balance) processing, AF (Auto Focus) processing, and the like are performed by the CPU 201. These shooting controls are performed by referring to an object detection result by the neural network processing unit 205.

The encoding processing unit 214 compresses a size of the image data by performing intra-frame prediction coding (intra-picture prediction coding), inter-frame prediction coding (inter-picture prediction coding), or the like on the image data from the image processing unit 213.

The display control unit 215 controls the display unit 216. The display unit 216 includes a display screen which is not illustrated in the drawing. The display control unit 215 generates an image that can be displayed on the display screen of the display unit 216 and outputs the image, that is, an image signal, to the display unit 216. In addition, the display control unit 215 can not only output the image data to the display unit 216 but also output the image data to an external device via the communication control unit 217. The display unit 216 displays the image on the display screen based on the image signal transmitted from the display control unit 215.

The display unit 216 includes an OSD (On Screen Display) function that is a function of displaying a setting screen such as a menu on the display screen. The display control unit 215 may superimpose an OSD image on the image signal and output the image signal to the display unit 216. An object frame can also be generated based on the object detection result by the neural network processing unit 205 and displayed by being superimposed on the image signal. The display unit 216 is constituted by a liquid crystal display, an organic EL display, or the like and displays the image signal transmitted from the display control unit 215. The display unit 216 may include, for example, a touch panel. In a case where the display unit 216 includes the touch panel, the display unit 216 may also function as the operation unit 204.

The communication control unit 217 is controlled by the CPU 201. The communication control unit 217 generates a modulation signal in conformity to a wireless communication standard such as IEEE802.11 to output the modulation signal to the communication unit 218, and also receives a modulation signal from an external device via the communication unit 218. In addition, the communication control unit 217 can transmit and receive a control signal of a video signal. For example, by controlling the communication unit 218, the communication control unit 217 may transmit a video signal compliant with a communication standard such as HDMI (registered trademark) (High Definition Multimedia Interface) or SDI (Serial Digital Interface).

The communication unit 218 converts the video signal and the control signal into physical electrical signals to perform transmission and reception to and from an external device. Note that the communication unit 218 performs not only the transmission and the reception of the video signal and the control signal but also reception or the like of the dictionary data for the object detection in the neural network processing unit 205.

The recording medium control unit 219 controls the recording medium 220. The recording medium control unit 219 outputs a control signal for controlling the recording medium 220 to the recording medium 220 based on a request from the CPU 201. For example, a nonvolatile memory, a magnetic disk, or the like is used as the recording medium 220. The recording medium 220 may be detachable as described above or may be non-detachable. The recording medium 220 saves coded image data or the like as a file in a format in conformity to a file system of the recording medium 220.

Each of the functional blocks 201 to 205, 212 to 215, 217, and 219 is mutually accessible via the internal bus 230.

Note that part of the functional blocks illustrated in FIG. 2 is realized by causing the CPU 201 serving as a computer included in the image pickup apparatus 100 to execute a computer program stored in the nonvolatile memory 203 or the like serving as a storage medium. However, part or all of those functional blocks may be realized by hardware. A dedicated circuit (ASIC), a processor (a reconfigurable processor or a DSP), or the like can be used as the hardware.

Figure 3:
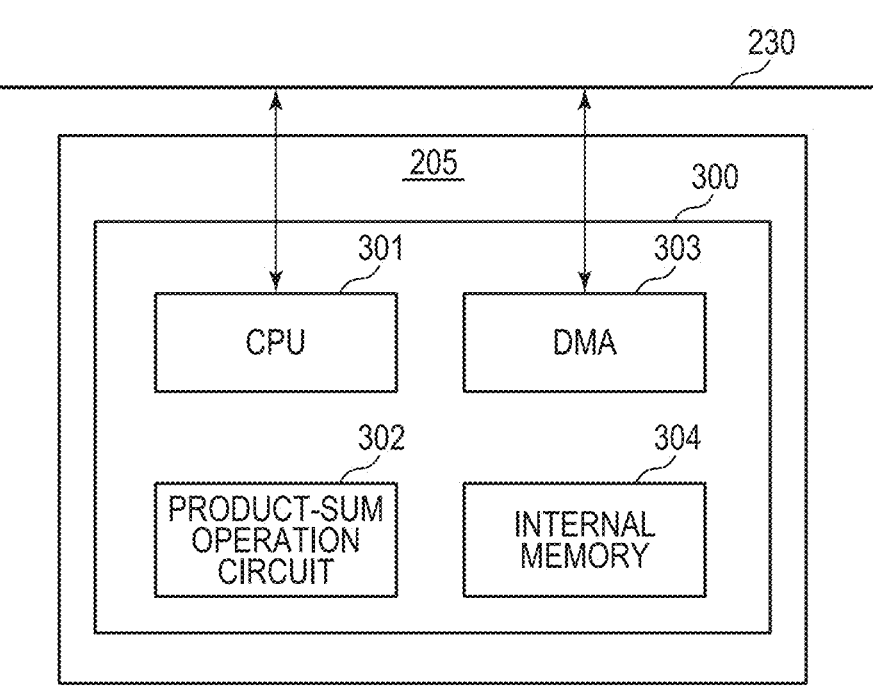
FIG. 3 is a block diagram illustrating a schematic configuration of a neural network processing unit 205 according to the first embodiment.

As illustrated in FIG. 3, the neural network processing unit 205 includes a CPU 301, a product-sum operation circuit 302, a dynamic memory access (DMA) 303, an internal memory 304, and the like in a neural core 300.

The CPU 301 acquires a computer program in which processing content of the neural network is described from the memory 202 or the nonvolatile memory 203 via the internal bus 230 or from the internal memory 304, and executes the computer program. The CPU 301 also performs control on the product-sum operation circuit 302 and the DMA 303.

The product-sum operation circuit 302 is a circuit that performs a product-sum operation in the neural network. The product-sum operation circuit 302 includes a plurality of product-sum operation units, and these product-sum operation units can execute the product-sum operation in parallel. In addition, the product-sum operation circuit 302 outputs intermediate data calculated at the time of the product-sum operation executed in parallel by the plurality of product-sum operation units to the internal memory 304 via the DMA 303.

The DMA 303 is a circuit specialized for data transfer without intermediation of the CPU 301 and performs data transfer between the memory 202 or the nonvolatile memory 203 and the internal memory 304 via the internal bus 230. In addition, the DMA 303 performs data transfer between the product-sum operation circuit 302 and the internal memory 304. Examples of data to be transferred by the DMA 303 include the computer program in which the processing content of the neural network is described, the trained coefficient parameter, the intermediate data calculated by the product-sum operation circuit 302, and the like.

The internal memory 304 stores the computer program in which the processing content of the neural network is described, the trained coefficient parameter, the intermediate data calculated by the product-sum operation circuit 302, and the like. In addition, the internal memory 304 may include a plurality of banks and may dynamically switch between the banks.

Figure 4:
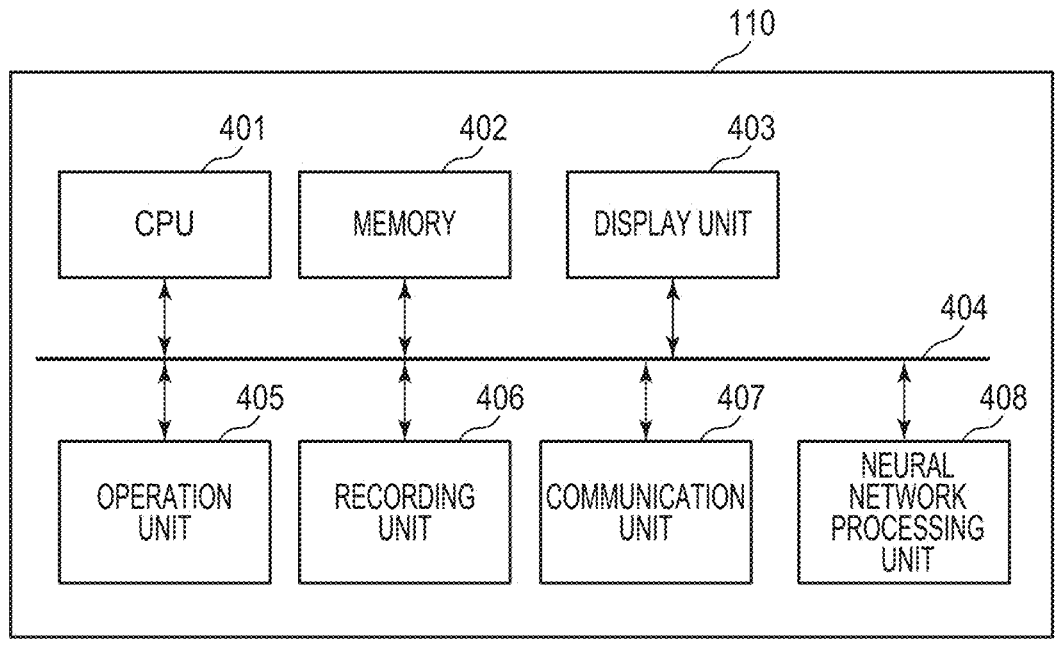
FIG. 4 is a block diagram illustrating a hardware configuration example of a server 110.

FIG. 4 is a block diagram illustrating a hardware configuration example of the server 110.

As illustrated in FIG. 4, the server 110 includes a CPU 401, a memory 402, a display unit 403, an operation unit 405, a recording unit 406, a communication unit 407, and a neural network processing unit 408.

Note that part of the functional blocks illustrated in FIG. 4 is realized by causing the CPU 401 serving as a computer included in the server 110 to execute a computer program stored in the recording unit 406 or the like serving as a storage medium. However, part or all of those functional blocks may be realized by hardware. A dedicated circuit (ASIC), a processor (a reconfigurable processor or a DSP), or the like can be used as the hardware.

The CPU 401 controls all processing blocks constituting the server 110 by executing a computer program stored in the recording unit 406.

The memory 402 is a memory that is mainly used as a work area of the CPU 401 or a temporary buffer area for data.

The display unit 403 is constituted by a liquid crystal panel, an organic EL panel, or the like and performs display of an operation screen or the like based on an instruction of the CPU 401.

An internal bus 404 is a bus with which each of the processing blocks in the server 110 is mutually connected.

The operation unit 405 is constituted by a keyboard, a mouse, a button, a touch panel, a remote controller, or the like and accepts an operation instruction of the user. Operation information that is input from the operation unit 405 is transmitted to the CPU 401, and the CPU 401 executes control on each of the processing blocks based on the operation information.

The recording unit 406 is constituted by a recording medium and is a processing block that stores or reads various data in or from the recording medium based on an instruction of the CPU 401. For example, the recording medium is constituted by an EEPROM, a built-in flash memory, a built-in hard disk, a removable memory card, or the like. In addition to the computer program, the input data and the teacher data which are the data for learning in the neural network processing unit 408, the dictionary data, and the like are saved in the recording unit 406.

The communication unit 407 includes hardware or the like configured to perform communication of a wireless LAN and a wired LAN. In the wireless LAN, for example, processing of IEEE802.11n/a/g/b standards is performed. The communication unit 407 is connected to an external access point by the wireless LAN and performs wireless LAN communication with another wireless communication device via the access point. In addition, the communication unit 407 performs communication via an external router or a switching hub by an Ethernet cable or the like in the wired LAN. The communication unit 407 performs communication with an external device including the image pickup apparatus 100 to exchange information such as the teacher data or the dictionary data.

The neural network processing unit 408 performs leaning processing of the neural network by the teacher data acquired via the communication unit 407. The neural network processing unit 408 is equivalent to the learning unit 114 in FIG. 1 and performs the learning processing for developing the dictionary data corresponding to respective objects in different classes by using the teacher data.

The neural network processing unit 408 is constituted by a GPU (Graphic Processing Unit), a DSP (Digital Signal Processor), or the like. In addition, the dictionary data that is a result of the learning processing performed by the neural network processing unit 408 is held in the recording unit 406.

Figure 5:
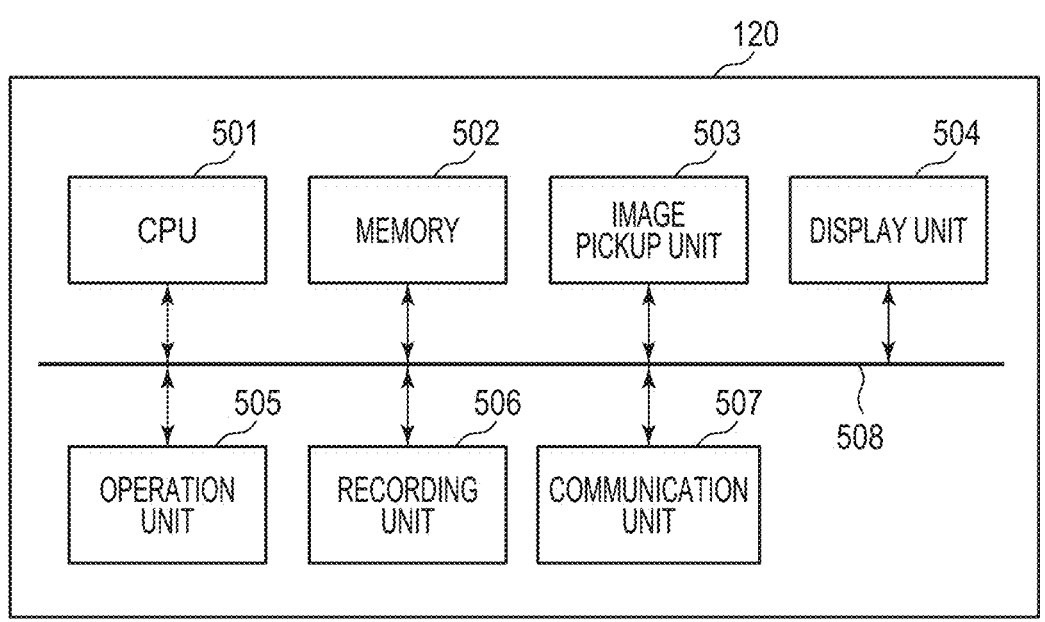
FIG. 5 is a block diagram illustrating a hardware configuration example of a mobile terminal 120.

FIG. 5 is a block diagram illustrating a hardware configuration example of the mobile terminal 120.

As illustrated in FIG. 5, the mobile terminal 120 includes a CPU 501, a memory 502, an image pickup unit 503, a display unit 504, an operation unit 505, a recording unit 506, a communication unit 507, and an internal bus 508. Part of the functional blocks illustrated in FIG. 5 is realized by causing the CPU 501 serving as a computer included in the mobile terminal 120 to execute a computer program stored in the recording unit 506 or the like serving as a storage medium. However, part or all of those functional blocks may be realized by hardware. A dedicated circuit (ASIC), a processor (a reconfigurable processor or a DSP), or the like can be used as the hardware.

The CPU 501 controls all processing blocks constituting the mobile terminal 120 by executing the computer program stored in the recording unit 506.

The memory 502 is a memory that is mainly used as a work area of the CPU 501 or a temporary buffer area for data. A program such as an OS (Operation System) or application software is loaded onto the memory 502 and executed by the CPU 501.

The image pickup unit 503 includes an optical lens, a CMOS sensor, a digital image processing unit, and the like and picks up an optical image that is input via an optical lens to acquire picked-up image data by converting the optical image into digital data. The captured image data acquired by the image pickup unit 503 is temporarily stored in the memory 502 and processed based on the control of the CPU 501. For example, recording into a recording medium by the recording unit 506, transmission to an external device by the communication unit 507, or the like is performed. The image pickup unit 503 also includes a lens control unit and performs control such as zoom, focus, or aperture adjustment based on a command from the CPU 501.

The display unit 504 is constituted by a liquid crystal panel, an organic EL panel, or the like and performs display based on an instruction of the CPU 501. An image of the teacher data is selected from among captured images, and also display of the operation screen, the captured images, or the like is performed to designate a network structure.

The operation unit 505 is constituted by a keyboard, a mouse, a button, a four-way operative key, a touch panel, a remote controller, or the like and accepts an operation instruction of the user. Operation information that is input from the operation unit 505 is transmitted to the CPU 501, and the CPU 501 executes control on each of the processing blocks based on the operation information. The recording unit 506 is constituted by a large capacity recording medium and is a processing block that stores and reads various data in and from the recording medium based on an instruction of the CPU 501. For example, the recording medium is constituted by a built-in flash memory, a built-in hard disk, a removable memory card, or the like.

The communication unit 507 includes processing hardware or the like configured to perform communication of an antenna, a wireless LAN, a wired LAN, or the like. For example, the communication unit 507 performs wireless LAN communication of the IEEE802.11n/a/g/b standards. The communication unit 507 is connected to an external access point by way of the wireless LAN and performs the wireless LAN communication with another wireless communication device via the access point. By the communication unit 507, the teacher data or the network structure which has been input from the user via the operation unit 505 is transmitted to the server 110.

The internal bus 508 is a bus configured to mutually connect each of the processing blocks in the mobile terminal 120.

Figure 6:
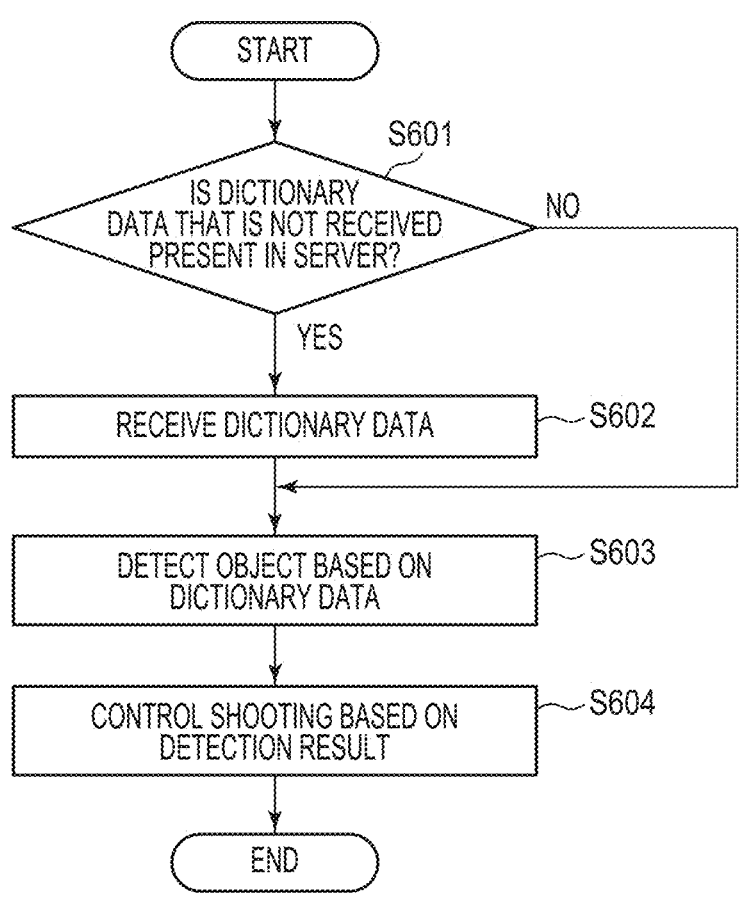
FIG. 6 is a flowchart illustrating processing of the image pickup apparatus according to the first embodiment.

FIG. 6 is a flowchart illustrating processing of the image pickup apparatus according to the first embodiment, and with reference to FIG. 6, a flow of the processing in which the dictionary data to be executed in the image pickup apparatus 100 is received, and object detection is performed to carry out image pickup control in the first embodiment will be described. This operation is realized when, in a state in which power of the image pickup apparatus 100 is on, the computer program stored in the nonvolatile memory 203 is loaded onto the memory 202, and the CPU 201 reads and executes the computer program in the memory 202.

In step S601, the image pickup apparatus 100 checks the server 110 via the communication unit 218 as to whether or not dictionary data that is not yet received from the server 110 is present. When the dictionary data that is not received from the server 110 is present in the server 110 (in step S601, YES is determined), in step S602, the dictionary data is acquired from the server 110 via the communication unit 218 to be stored in the nonvolatile memory 203. When the dictionary data that is not received from the server 110 is absent (in step S601, NO is determined), the flow proceeds to step S603.

In step S603, the object detection is performed by the neural network processing unit 205 by using the dictionary data recorded in the nonvolatile memory 203. The dictionary data may be copied from the nonvolatile memory 203 to the memory 202 or the internal memory 304 of the neural network processing unit 205 to be used in the object detection. In addition, the object detection in step S603 is performed by using the image data acquired by the image pickup unit 212 as the input data.

In step S604, image pickup control such as autofocus is performed by the image pickup unit 212 based on the object detection result. That is, focus is on the detected object, and also the image pickup control such as autofocus and exposure control is performed such that appropriate exposure is established. Herein, steps S603 and S604 function as an image pickup step of performing the object detection based on the dictionary data and performing the predetermined image pickup control on the object detected by the object detection.

According to the present embodiment, the step of acquiring the dictionary data from the server, and the object detection based on the acquired dictionary data and the shooting control are performed in the same flow. However, the configuration is not limited to this, and for example, a mode in which or timing at which the dictionary data is acquired by inquiring the server in advance during a non-shooting period may be provided. In addition, with regard to the dictionary data used for the object detection, it is not necessarily to inquire the server to acquire the dictionary data that has not yet been acquired and use the dictionary data as it is. For example, before the dictionary data is used (for example, before step S604), as a step of determining the dictionary data, a step of accepting a user operation or a step of automatically determining the dictionary data may be provided.

Figures 7A, 7B:
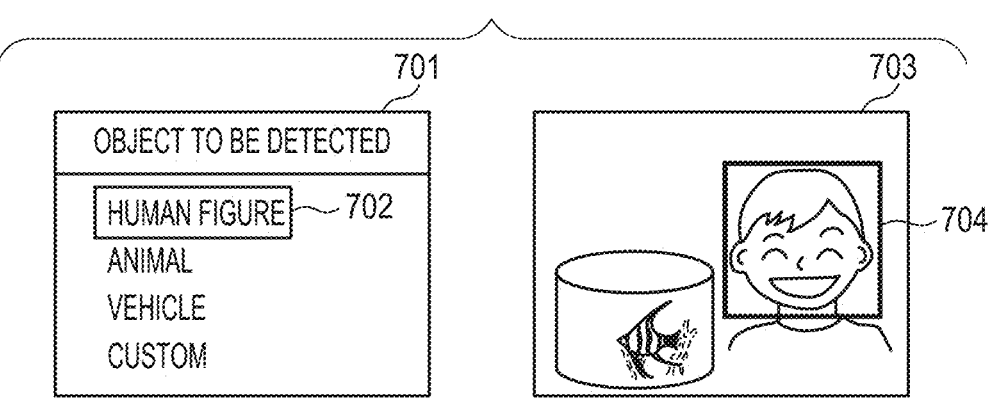
FIG. 7A is a diagram for describing an example of object detection based on dictionary data.
FIG. 7B is a diagram for describing an example of the object detection based on the dictionary data.

FIGS. 7A and 7B are diagrams for describing an example of the object detection based on the dictionary data.

The dictionary data of the first embodiment has a computer program in which processing content for executing an object detection task by the neural network processing unit 205 is described or a trained coefficient parameter for each type of the object.

For example, as a type of the object for which the dictionary data is registered, a human figure, an animal such as a dog or a cat, a vehicle such as an automobile, a motorbike, or the like is exemplified.

Reference numerals 701 and 705 in FIGS. 7A and 7B denote examples of a menu screen of the display unit 216, on which an object to be detected is set by the user via the operation unit 204. In FIG. 7A, "human figure" 702 is set as the object to be detected. When the "human figure" is set, the object detection is performed by using the dictionary data of the "human figure" which is stored in advance in the nonvolatile memory 203. Reference numeral 703 denotes a shot image displayed on the display unit 216, illustrating a state in which a face of the "human figure" is detected, and a frame 704 is superimposed to be displayed.

In FIG. 7B, "custom" 706 is set as the object to be detected. In a case of the "custom", the object detection is performed by using, for example, "fish" as the dictionary data for custom which is received from the server 110. Reference numeral 707 denotes a shot image displayed on the display unit 216, illustrating a state in which the dictionary data of the "custom" is "fish", and a frame 708 is superimposed on the detected fish to be displayed.

Figure 8:
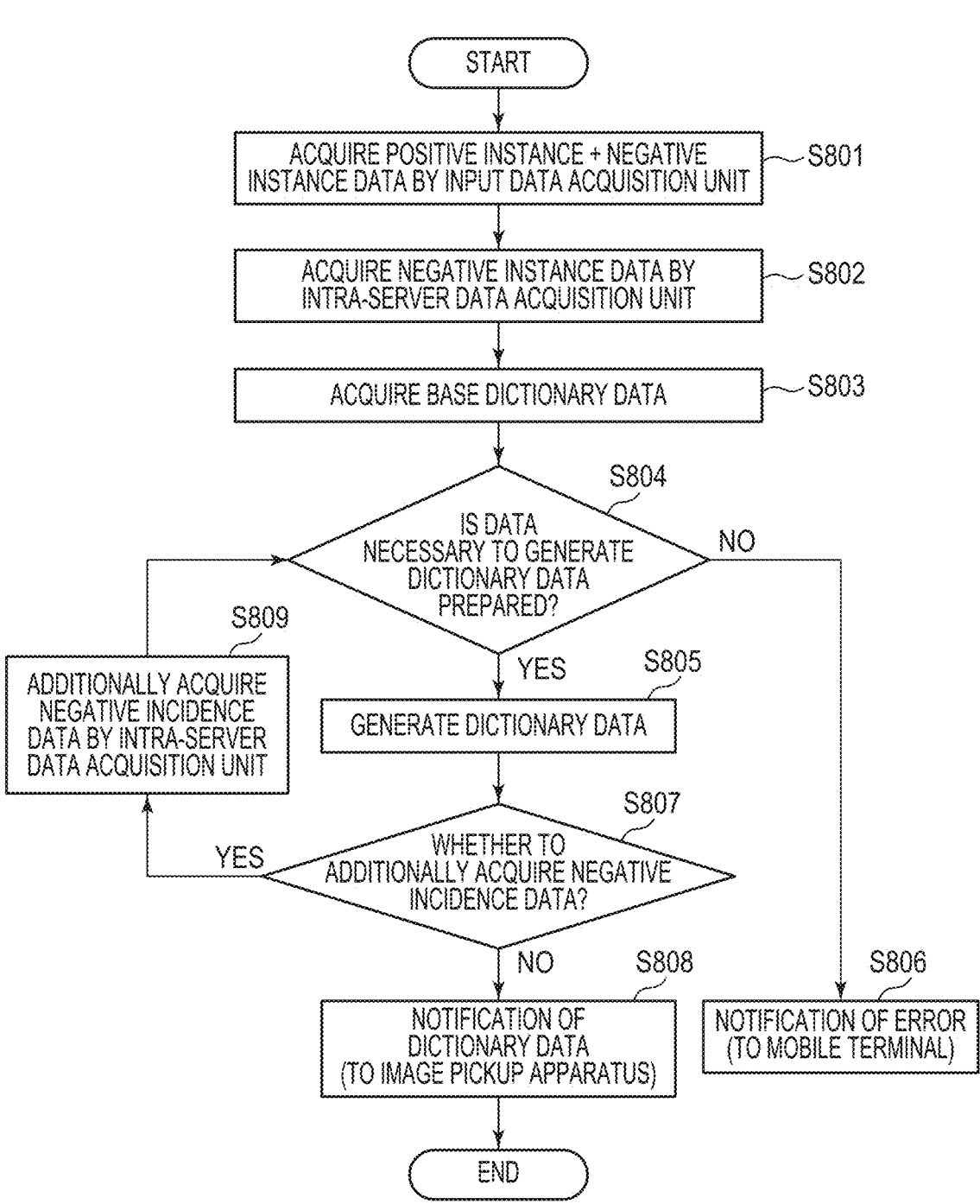
FIG. 8 is a flowchart illustrating processing of a server according to the first embodiment.
Figure 9:
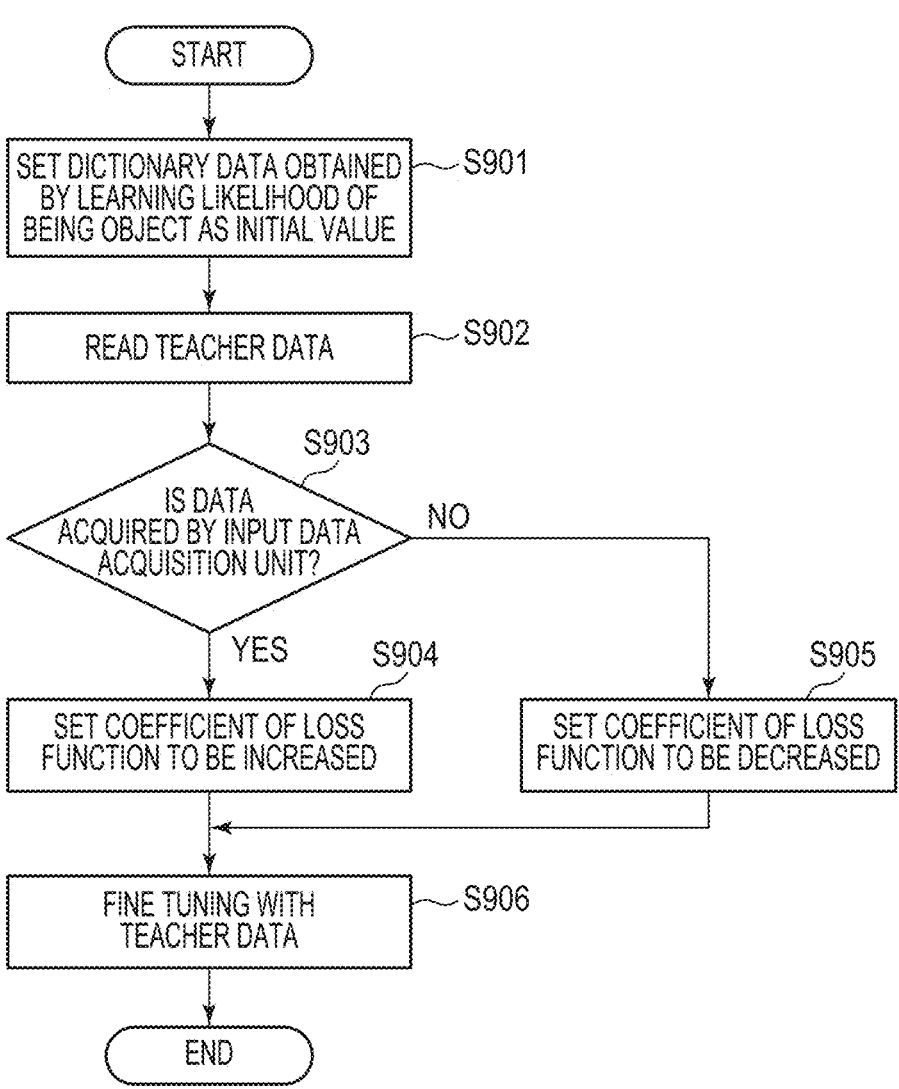
FIG. 9 is a flowchart for describing a flow of processing for dictionary data generation according to the first embodiment.

FIG. 8 and FIG. 9 are flowcharts illustrating processing performed by the CPU 401 of the server 110 according to the first embodiment.

Note that the processing of FIG. 8 is realized, in a state in which the power of the server 110 is on, when the computer program stored in the recording unit 406 is loaded onto the memory 402, and the CPU 401 reads and executes the computer program in the memory 402.

With reference to FIG. 8, processing will be described which is extracted from the processing performed by the CPU 401 of the server 110, in which information related to the teacher data and the network structure is acquired from the mobile terminal 120 to generate dictionary data, and the generated dictionary data is transmitted to the image pickup apparatus 100.

In step S801, the server 110 acquires positive instance data and negative instance data from the mobile terminal 120 via the communication unit 407. In step S802, negative instance data saved in advance in the recording unit 406 is acquired. Herein, steps S801 and S802 function as teacher data acquisition means for acquiring teacher data for object detection. Furthermore, in step S803, the base dictionary data saved in the recording unit 406 is acquired.

Subsequently, in step S804, it is determined whether or not data necessary to generate the dictionary data is prepared through steps S801 to S803. When the data is prepared (in step S804, YES is determined), the flow proceeds to step S805. When at least part of the data is not prepared (in step S804, NO is determined), the flow proceeds to step S806.

For example, when the teacher data is present but the base dictionary data is absent, NO is determined in step S804. When NO is determined, in step S806, notification of occurrence of an error to the mobile terminal 120 is performed via the communication unit 507.

In step S805, the neural network processing unit 408 generates custom dictionary data. As the generation of the dictionary data, a method of generating the dictionary data through learning from the teacher data (for example, FIG. 9) is proposed. Step S805 functions as learning means for generating the custom dictionary data.

FIG. 9 is a flowchart for describing a flow of processing for the generation of the dictionary data according to step S805.

When learning is to be performed in a state in which an initial value of the dictionary data is a random number, a large number of pieces of teacher data are required. When the large number of pieces of teacher data are required, since it takes time for the user to input the teacher data, a method of performing learning with a small number of pieces of teacher data is desirable.

In view of the above, in step S901, dictionary data obtained by learning a wide variety of objects in advance is set to an initial value as the base dictionary data. As the base dictionary data, dictionary data obtained by learning a specific type of objects such as a dog, a cat, or a motorcycle may be used.

In step S902, the teacher data used for learning is read.

In step S903, it is determined whether or not the read teacher data is the data acquired by the input data acquisition unit, that is, whether or not the read teacher data is the data acquired from the mobile terminal 120. When the data is data acquired by the input data acquisition unit, the flow proceeds to step S904. When the data is not data acquired by the input data acquisition unit, the flow proceeds to step S905.

In step S904, a coefficient of a loss function for the read data is set to be larger than that of the data acquired by the intra-server data acquisition unit 112. For example, the coefficient is set such that the loss calculated at the time of learning is doubled. This is because the teacher data acquired by the input data acquisition unit is considered as data with a high object detection accuracy on which an intention of the user is clearly reflected.

In addition, in step S905, the coefficient of the loss function for the read data is set to be smaller than that of the data acquired by the input data acquisition unit. When the negative instance data acquired by the intra-server data acquisition unit 112 is not data provided from the user, learning is to be performed by taking into account a possibility that the positive instance data desired by the user to be detected is included in part of the negative instance data. In view of the above, by separating the processing into step S904 and step S905, it is possible to reduce negative effects that a loss, in a case where the positive instance data is mixed in the negative instance data, is calculated to be large.

In step S906, learning is performed based on the teacher data. Since the initial value of the dictionary data is not a random number but is a value obtained by learning a likelihood of being the object, so-called fine tuning is carried out. Herein, step S906 functions as dictionary generation means for generating the dictionary data by performing the learning based on the teacher data.

The description returns to the flowchart in FIG. 8. When the generation of the dictionary data is performed in step S805, it is determined in step S807 whether to additionally acquire the negative instance data. For example, when a value of the loss function of the learning is equal to or less than a predetermined threshold, the generation of the dictionary data is determined to be successful. When the value of the loss function is greater than the predetermined threshold, the generation of the dictionary data is determined to have failed. When the generation of the dictionary data has failed, it is determined that the negative instance data is to be additionally acquired. Herein, step S807 functions as determination means for determining whether to further acquire the negative instance teacher data by the intra-server data acquisition unit 112 in addition to the data acquired by the intra-server data acquisition unit 112. When the generation of the dictionary data is successful (in step S807, NO is determined), in step S808, the dictionary data is transmitted to the image pickup apparatus 100 via the communication unit 407.

When the generation of the dictionary data has failed (in step S807, YES is determined), the flow proceeds to step S809, and the intra-server data acquisition unit 112 additionally acquires the negative instance data. After the acquisition, the flow returns to step S804. When the generation failure of the dictionary data has continued a predetermined number of times, it is assumed that the generation of the dictionary data is not to be successful even when further negative instance data is added, and NO is determined in step S804 so that notification of an error may be performed in step S808.

Figure 10:
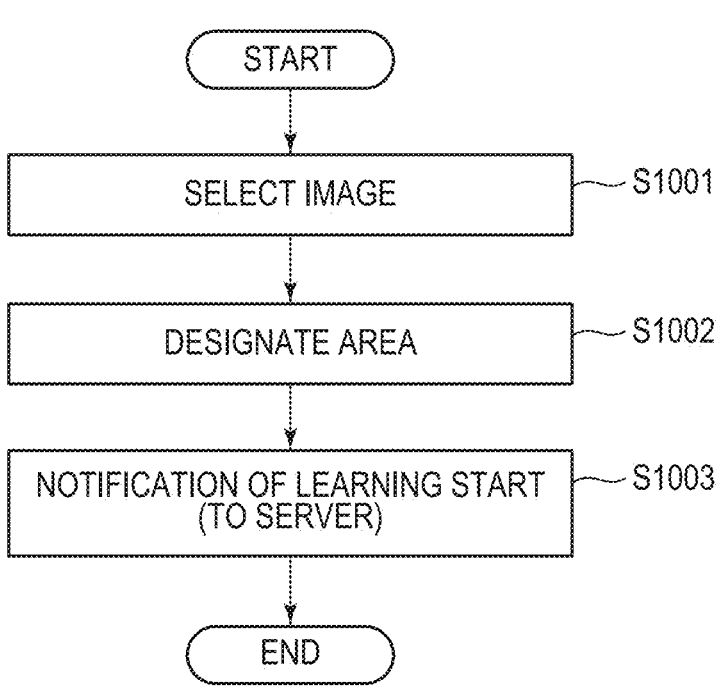
FIG. 10 is a flowchart illustrating an example of a flow of processing executed by the mobile terminal 120 according to the first embodiment.

FIG. 10 is a flowchart illustrating an example of a flow of processing executed by the mobile terminal 120 according to the first embodiment.

An extraction regarding processing in the mobile terminal 120 will be described in which information related to the teacher data and the network structure is input to notify the server 110 of learning start in the mobile terminal 120. This operation is realized, in a state in which the power of the mobile terminal 120 is on, when the computer program stored in the recording unit 506 is loaded onto the memory 502, and the CPU 501 reads and executes the computer program in the memory 502.

Figure 11A:
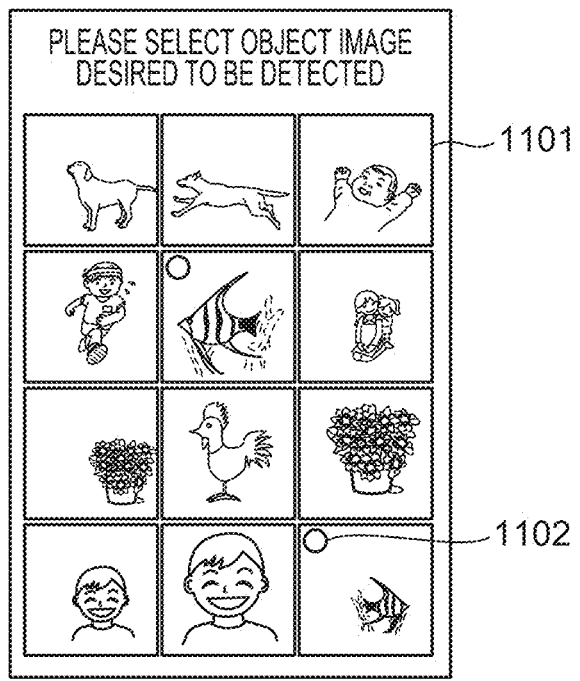
FIG. 11A is a diagram for describing an input screen example for teacher data and a network structure of a display unit 504 of the mobile terminal according to the first embodiment.
Figure 11B:
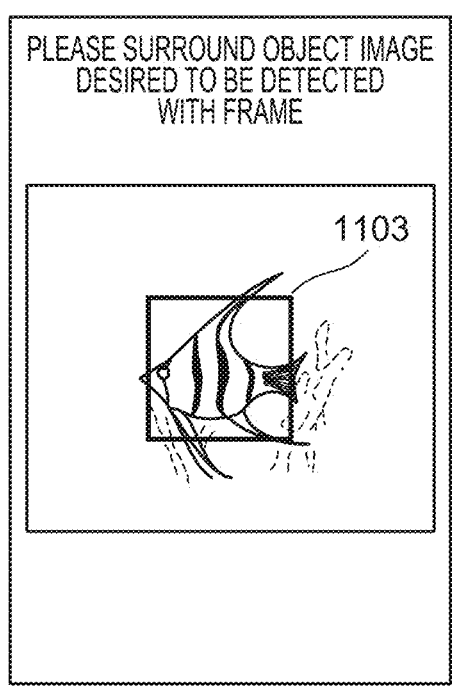
FIG. 11B is a diagram for describing an input screen example for the teacher data and the network structure of the display unit 504 of the mobile terminal according to the first embodiment.
Figure 11C:
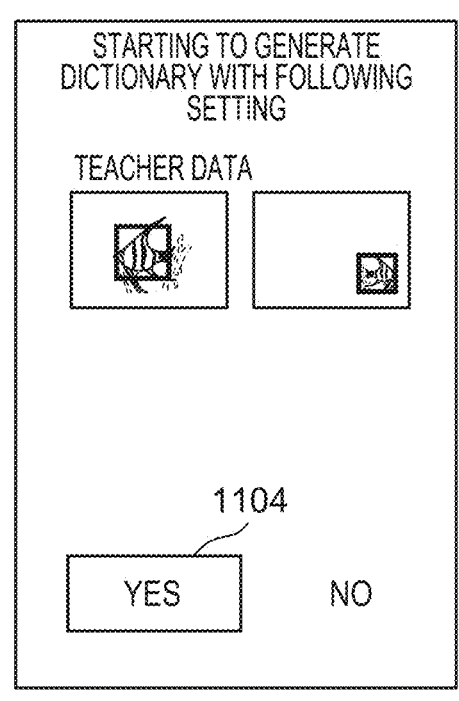
FIG. 11C is a diagram for describing an input screen example for the teacher data and the network structure of the display unit 504 of the mobile terminal according to the first embodiment.

With reference to FIGS. 11A, 11B, and 11C, the flow of the processing of the flowchart in FIG. 10 will be described.

FIGS. 11A, 11B, and 11C are diagrams for describing an input screen example for the teacher data of the display unit 504 of the mobile terminal according to the first embodiment.

In step S1001 of FIG. 10, the user selects, via the operation unit 505, an image to be used as the teacher data from among captured images stored in the recording unit 506. FIG. 11A illustrates an example of an image selection screen by the display unit 504, and 12 captured images are displayed as indicated by reference numeral 1101. For example, the user selects two images through touching or the like by the operation unit 505 as the teacher data from among these 12 captured images. As indicated by reference numeral 1102, captured images with a circle displayed on top left are set as the selected images of the teacher data.

In step S1002, the user designates, via the operation unit 505, an object area that is set as a target in the image for two images selected as the teacher data. FIG. 11B illustrates an example of an input screen for the object area by the display unit 504, and a rectangular frame 1103 indicates the object area input by the user. The object area is set for each of the images selected as the teacher data. As a method of setting the object area, the area selection may be directly performed from the displayed image via a touch panel which is part of the operation unit 505 and which is integrated with the display unit 504.

Alternatively, the object area may be a characteristic object area selected by performing selection, fine adjustment, or the like from the object frame simply detected based on a feature amount such as an edge by the CPU 501 or the like.

In step S1003, the user determines that generation of the dictionary data via the operation unit 505 is to be started. FIG. 11C illustrates a confirmation window example for the start of the generation of the dictionary data by the display unit 504, in which YES or NO is input. When YES indicated by reference numeral 1104 is selected, the teacher data and information of the type of the image pickup apparatus are transmitted to the server 110 via the communication unit 507, and the generation of the dictionary data is performed in the server 110. When NO is selected in FIG. 11C, the processing is terminated.

Note that the object area in the image data of the teacher data is treated as a positive instance and other areas are treated as negative instances during the dictionary data generation in the server 110. In the explanation described above, an example of the selection of the image in which the object area is present has been illustrated, but an image in which the object area is absent may be selected. In that case, the information of the object area is not input, and the whole image is treated as a negative instance.

As described above, in accordance with the image processing system of the first embodiment, it is possible to generate any dictionary data by the user from the small number of pieces of positive instance teacher data.

Other Embodiments

The present invention has been described above in detail by way of the preferred embodiment, but the present invention is not limited to the above-described embodiment. Various modifications can be made based on the gist of the present invention, and those modifications are not to be excluded from the scope of the present invention.

Subject matters to which the present invention may be applied are not limited to the image pickup apparatus 100, the server 110, the mobile terminal 120, and the like which are explained in the above-described embodiment. For example, even when the image pickup apparatus 100 is a system constituted by a plurality of apparatuses, a function similar to the above-described embodiment can be realized. Furthermore, the function can be realized when part of the processing of the image pickup apparatus 100 is implemented by an external apparatus on a network. In addition, the processing of the mobile terminal 120 can be implemented by the image pickup apparatus 100.

Note that a computer program for realizing the functions of the above-described embodiment for part or all of the control in the present embodiment may be supplied to the image pickup system or the like via a network or various storage media. Then, a computer (or a CPU, an MPU, or the like) in the image pickup system or the like may read and execute the program. In the above-described case, the program and a storage medium storing the program constitute the present invention.

The invention is not limited to the above-described embodiments, and various modifications and alterations can be made without departing from the spirit and the scope of the present invention. Therefore, the following claims are accompanied to make the scope of the present invention public.

According to the present invention, it is possible to generate or use the dictionary data with detection performance of a certain level or more from a small number of pieces of positive instance data.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image processing apparatus comprising:
   first acquisition means for acquiring first teacher data including image data of a positive instance for a first target;
   second acquisition means for acquiring second teacher data including image data of a negative instance for the first target; and
   generation means for generating first dictionary data for detecting the first target based on the teacher data acquired by the first acquisition means and the second acquisition means, the image processing apparatus being characterized in that
   the generation means performs additional learning on second dictionary data to generate the first dictionary data, and that a number of pieces of the first teacher data acquired by the first acquisition means is smaller than a number of pieces of the second teacher data acquired by the second acquisition means.

2. The image processing apparatus according to claim 1, characterized in that a location from which the first teacher data is acquired is different from a location from which the second teacher data is acquired.

3. The image processing apparatus according to claim 1, characterized in that at least one piece of the first teacher data is teacher data provided from a user.

4. The image processing apparatus according to claim 1, characterized in that the second acquisition means acquires data that is prepared in advance.

5. The image processing apparatus according to claim 1, characterized in that the first acquisition means acquires the second teacher data in addition to the acquired first teacher data.

6. The image processing apparatus according to claim 1, characterized in that a second target is obtained by further limiting the first target.

7. The image processing apparatus according to claim 1, characterized in that the first target is a characteristic object area.

8. The image processing apparatus according to claim 1, characterized in that the first target is a specific object.

9. The image processing apparatus according to claim 1, characterized in that the generation means includes determination means for determining whether to further acquire second teacher data including image data of a negative instance by the second acquisition means in addition to the second teacher data acquired by the second acquisition means.

10. The image processing apparatus according to claim 1, characterized in that the number of pieces of the first teacher data acquired by the first acquisition means is 100 or less, and that the number of pieces of the teacher data acquired by the second acquisition means is 101 or more.

11. The image processing apparatus according to claim 1, characterized by comprising control means for performing object detection based on the dictionary data generated by the generation means to perform shooting control.

12. The image processing apparatus according to claim 1, characterized in that the generation means sets a coefficient of a loss function in a case where learning is performed with the data acquired by the first acquisition means to be larger than a coefficient of a loss function in a case where learning is performed with the data acquired by the second acquisition means.

13. An image pickup apparatus comprising:
   transmission means for transmitting first teacher data including image data of a positive instance for a first target;
   reception means for receiving first dictionary data generated by using the first teacher data transmitted by the transmission means and second teacher data including image data of a negative instance for the first target; and
   control means for performing object detection based on the first dictionary data received by the reception means to perform shooting control, the image pickup apparatus being characterized in that
   the first dictionary data is dictionary data generated by performing additional learning on second dictionary data by using the first teacher data and the second teacher data including the image data of the negative instance for the first target, and
   that a number of pieces of the first teacher data is smaller than a number of pieces of the second teacher data.

14. A control method for an image processing apparatus, the control method comprising:
   a first acquisition step of acquiring first teacher data including image data of a positive instance for a first target;
   a second acquisition step of acquiring second teacher data including image data of a negative instance for the first target; and
   a generation step of generating first dictionary data for detecting the first target based on the teacher data acquired by the first acquisition step and the second acquisition step, the control method being characterized in that
   in the generation step, additional learning is performed on second dictionary data to generate the first dictionary data, and that a number of pieces of the first teacher data acquired in the first acquisition step is smaller than a number of pieces of the second teacher data acquired in the second acquisition step.

15. A control method for an image pickup apparatus, the control method comprising:
   a transmission step of transmitting first teacher data including image data of a positive instance for a first target;
   a reception step of receiving first dictionary data generated by using the first teacher data transmitted in the transmission step and second teacher data including image data of a negative instance for the first target; and
   a control step of performing object detection based on the first dictionary data received in the reception step to perform shooting control, the control method being characterized in that
   the first dictionary data is dictionary data generated by performing additional learning on second dictionary data by using the first teacher data and the second teacher data including the image data of the negative instance for the first target, and that a number of pieces of the first teacher data is smaller than a number of pieces of the second teacher data.

\* \* \* \* \*